March 16, 1948.   R. C. GODFREY   2,437,851
COOLING OF FLUIDS
Filed Nov. 18, 1944
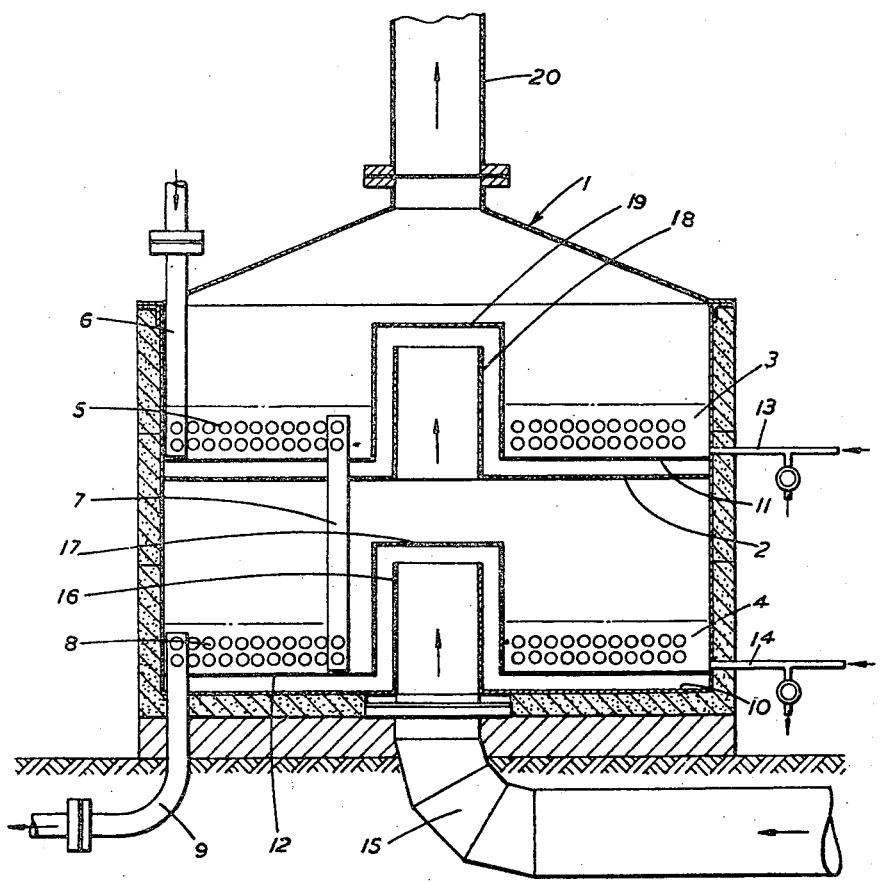
Inventor
ROBERT COWELL GODFREY
By
[signature]
Attorney Patented Mar. 16, 1948

2,437,851

UNITED STATES PATENT OFFICE 2,437,851

COOLING OF FLUIDS

Robert Cowell Godfrey, London, England, assignor to The British Oxygen Company Limited, London, England, a British company Application November 18, 1944, Serial No. 564,075
In Great Britain January 21, 1944

6 Claims. (Cl. 62—168)

The present invention relates to the cooling of fluids.

In many industrial processes the need arises to cool a relatively warm fluid by heat exchange with a gaseous coolant. Where the gaseous coolant is available in the vapour-free condition or has a vapour content substantially below saturation point, it has been proposed to take advantage of the evaporative cooling of a liquid such as water, to impart the requisite cold to the warm fluid. For example, in the decomposition of a gaseous mixture, such as air, by liquefaction and rectification, a method of precooling has been adopted comprising the steps of compressing the gaseous mixture, passing the compressed gaseous mixture in heat exchange relationship with a vaporisable liquid and cooling the liquid by conducting substantially vapour-free gases therethrough in a finely divided state. The gases used for this purpose may conveniently be one or more of the decomposition products which, having been subjected to low temperature separation, are substantially vapour-free and available at low temperature so that in addition to the cold due to the vaporisation of the liquid, there is imparted to the compressed gaseous mixture cold due to the sensible cold of the decomposition product.

Heretofore such a method of heat exchange has been carried out by passing the fluid to be cooled through a tubular element immersed in the vaporisable liquid and conducting the gaseous coolant through the liquid in finely divided state. The gaseous coolant evaporates approximately as much liquid as it requires for its saturation with the vapour and the liquid evaporated is replenished from any convenient source. If the rates of flow of the fluid and gaseous coolant are maintained constant, the liquid attains a constant temperature intermediate the respective outlet temperatures of the fluid and the gaseous coolant.

Investigation has now shown that by transferring the major portion of the heat content to be removed from the fluid at a temperature where the quantity of vapour which the gaseous coolant can take up to attain saturation is relatively high, and transferring the residual heat content to be removed from the fluid by the gaseous coolant at a temperature where the quantity of vapour which the gaseous coolant can take up to attain saturation is relatively low, the temperature of the fluid can be reduced to a lower level than is possible where the heat is transferred to the gaseous coolant at a single stage as heretofore.

This may be achieved in accordance with the invention by passing the fluid to be cooled through a thermal conductor in heat transfer relationship with a series of separate masses of vaporisable liquid and effecting the evaporative cooling of the masses of liquid by passing therethrough a gaseous coolant in finely divided state, whereby heat interchange between the fluid and the gaseous coolant through the intermediary of the vaporisable liquid occurs at temperatures which decrease successively in the direction of flow of the fluid.

The mass of liquid through which the gaseous coolant finally passes constitutes the first cooling stage for the fluid and as the gaseous coolant has absorbed heat from the mass or masses of liquid through which it has previously passed, heat transfer between the fluid and the coolant takes place at a relatively high temperature where the quantity of liquid vaporised is high.

The mass of liquid through which the gaseous coolant first passes constitutes the final cooling stage for the fluid, the temperature of which has previously been reduced by transfer of heat to the mass or masses of liquid through which it has already passed. The transfer of heat in the final stage therefore takes place at a relatively low temperature and the fluid can by this means be cooled to a temperature approaching the inlet temperature of the gaseous coolant.

In order to ensure the maintenance of constant heat transfer conditions at each cooling stage, fresh liquid may be automatically introduced into each stage so as to maintain the masses of liquid constant in depth.

The advantage accruing from the use of the invention in the precooling of air will be seen from the following examples:

Example 1

It is required to cool 2400 M³/hr. (2940 kg./hr.) of compressed air at 160 atmospheres and 185° by heat exchange with 2000 M³/hr. (2398 kg./hr.) of dry nitrogen at 52° C. Employing single stage cooling as practised heretofore, namely, by immersing a coil in a bath of water and passing the air through the coil whilst conducting the nitrogen through the water in finely divided state, it was found that the bath attained a steady temperature of 53° C., the temperature of the effluent warmed nitrogen and the effluent cooled air being only a fraction of a degree lower and higher respectively than this temperature. The heat transferred from the air to the nitrogen can be calculated approximately as follows:

Amount of water vapour taken up by $N_2$ at 53° C.= 92 grams/cu. metre

Latent heat of $H_2O$ @ 53° C.=566 K. Cals./kg.

Total heat taken from H. P. air due to latent heat of vaporization=
$$\frac{92 \times 2000 \times 566}{1000} = 104,100 \text{ K. Cals./hr.}$$

Total heat taken from H. P. air due to the sensible heat of $N_2 = 2398 \times 0.243 \times 1 = 583$ K. Cal./hr.

Total heat to be dissipated=104,683 K. Cal./hr.

By proceeding in accordance with this invention and employing three-stage cooling, it was found, using the same quantities of gas and the same inlet temperatures, that the outlet temperature of the air from the final stage was reduced to 10° C. while the final outlet temperature of the nitrogen was approximately 54° C. Computation on the foregoing lines based upon the inlet and outlet temperatures observed in the intermediate stage gave a total heat transfer of approximately 143,000 K. Cal./kg.

*Example 2*

It is required to cool 2,400 cu. metres per hour (2940 kg./hr.) of compressed air at 160 atmospheres and 74° C. by heat exchange with 2000 metres per hour (2398 kg./hr.) of dry nitrogen at 29° C. Employing single stage cooling, as practised heretofore, namely, by immersing a coil in a bath of water and passing the air through the coil whilst conducting the nitrogen through the water in finely divided state, it was found that the bath attained a steady temperature of 30° C., the temperature of the effluent warmed nitrogen and the effluent cooled air being only a fraction of a degree lower and higher respectively than this temperature. The heat transferred from the air to the nitrogen calculated as above amounts to approximately 35,383 K. Cal./hr.

By proceeding in accordance with this invention and employing three-stage cooling, it was found, using the same quantities of gas and the same inlet temperature that the outlet temperature of the air from the final stage was reduced to 7° C. while the final outlet temperature of the nitrogen was approximately 33° C. Computation on the foregoing lines based upon the inlet and outlet temperatures observed in the intermediate stage gave a total heat transfer of approximately 57,000 K. Cal./hr.

It is noteworthy that despite a considerable difference in the inlet temperatures of the air to be cooled (185° C. in Example 1 and 74° C. in Example 2) the outlet temperatures attained in the two cases are of the same order, namely 10° C. and 7° C. respectively. By proceeding in accordance with this invention therefore it is possible to achieve substantial uniformity in outlet temperature, despite considerable variations in inlet temperature.

In principle, the greater the number of cooling stages, the lower is the temperature level at which the mass of liquid, through which the fluid finally passes, can be maintained. In practice, however, it is found that two or three stages suffice; a larger number of stages results in an elaboration of the apparatus which, as a rule, will be found to be disproportionate to the slightly improved cooling effect obtainable.

Apparatus for carrying the invention into effect may comprise a plurality of serially connected tubular elements for conveying the fluid to be cooled and a separate liquid container for each tubular element, each container being adapted to be supplied with a vaporisable liquid and having an inlet for a gaseous coolant arranged below the tubular element, the arrangement being such that the gaseous coolant traverses the liquid in each container in succession and in a direction counter to that of the fluid with respect to the successive masses of liquid.

To ensure saturation of the gaseous coolant with vapour as it traverses the liquid, it is of advantage to provide between the inlet for the gaseous coolant and the tubular element in each container a gas dispersing member such as a perforated plate. Where the heat transfer takes place at sub-atmospheric temperatures, it is desirable to surround the liquid containers with heat insulating material.

Apparatus for the precooling in two stages of compressed air which is to be liquefied and separated into an oxygen fraction and a gaseous nitrogen fraction is shown by way of illustration in the accompanying drawing, which is a view of the apparatus in central longitudinal section.

Referring to the drawing the apparatus comprises a closed cylindrical chamber 1 divided by a transverse partition 2 into two separate watertight containers 3, 4. In container 3 there is mounted a tubular element for conveying the compressed air to be cooled, the tubular element being constituted by a coiled tube 5 arranged as a double layer spiral having an inlet 6 for connecting to the compressed air supply line, and an outlet 7 leading through the partition 2 to a second tubular element constituted by a coiled tube 8 which is similar to tube 5 and is disposed in container 4. From coiled tube 8 the air passes out through an outlet 9 leading to the usual liquefaction and fractionating devices used in air separation systems.

The coiled tube 5 is disposed, as shown, some distance from the partition 2 which forms the base of container 3, and tube 8 is likewise spaced from the base 10 of container 4. Between the lower layer of coiled tube 5 and the partition 2 there is provided a perforated plate 11 and between the lower layer of coiled tube 8 and the base 10 is a similar perforated plate 12.

The containers 3 and 4 are fitted with inlet pipes 13 and 14 respectively for connection to a water supply through flow control means (not shown) whereby fresh water is automatically introduced into the containers to maintain the water at constant depth with the coiled tubes 5 and 8 fully immersed.

The dry gaseous coolant, in the present instance a nitrogen fraction from the fractionating device, is supplied to the apparatus through a conduit 15 which is connected to an uptake pipe 16 extending from a central inlet in the base 10 and projecting into a bell 17 in the lower container 4 from which the gas passes to the space between the base 10 and the perforated plate 12 to bubble through the overlying mass of water surrounding the coiled tube 8. An uptake pipe 18 similar to pipe 16 and a bell 19 similar to bell 17 are provided in the upper container 3 for receiving the gas from container 4 and leading it under the perforated plate 11. The gaseous stream which bubbles up through the water in the upper container is led away from the apparatus through an outlet 20.

Using this apparatus for cooling 2400 cubic metres per hour of air at 40° C. compressed to 200 atmospheres by heat interchange with 2000 cubic metres per hour of a dry nitrogen fraction at 5° C., it was found that the air leaving pipe 9 had a temperature of 10° C. The effluent nitrogen fraction leaving the outlet 20 saturated with water had a temperature of 21° C.

It will be appreciated that a series of such superimposed containers each housing a coiled tube could be provided through which the gas to be cooled is passed or that the containers, instead of being superimposed, could be arranged side by side.

I claim:

1. The method of cooling a fluid which comprises passing the fluid through a thermal conductor in heat transfer relationship with a succession of separate masses of a liquid and effecting the evaporative cooling of the masses of liquid by passing therethrough in finely divided state, a gaseous coolant having a vapour content substantially below the saturation point at the inlet temperature, the direction of flow of the gaseous coolant with respect to the successive masses of liquid being in a direction counter to that of the fluid with respect to the successive masses of liquid, whereby heat interchange between the fluid and the gaseous coolant through the intermediary of the vaporisable liquid occurs at temperatures which decrease successively in the direction of flow of the fluid.

2. The method of cooling a fluid which comprises passing the fluid through a thermal conductor comprising at least two serially connected tubular elements, each element being immersed in a separate mass of liquid, and effecting the evaporative cooling of the masses of liquid by passing a gaseous coolant therethrough in series, the direction of flow of the gaseous coolant with respect to the successive masses of liquid being in a direction counter to that of the fluid with respect to the successive masses of liquid.

3. The method of cooling a fluid which comprises passing the fluid through a thermal conductor comprising at least two serially connected tubular elements, each element being immersed in a separate mass of liquid, effecting the evaporative cooling of the mases of liquid by passing a gaseous coolant therethrough in series, the direction of flow of the gaseous coolant with respect to the successive masses of liquid being in a direction counter to that of the fluid with respect to the successive masses of liquid, and maintaining the mass of liquid at each stage constant.

4. Apparatus for cooling a fluid by heat interchange with a gaseous coolant, comprising a plurality of containers each adapted to contain a mass of liquid, a tubular element in each said container located below liquid level, said tubular elements being serially inter-connected for conveying the fluid through the apparatus and an inlet to each said container for a gaseous coolant arranged below the tubular element, the arraigement being such that the gaseous coolant traverses the liquid in each container in succession, the direction of flow of the gaseous coolant with respect to the successive masses of liquid being in a direction counter to that of the fluid with respect to the successive masses of liquid.

5. Apparatus for cooling a fluid by heat interchange with a gaseous coolant, comprising a plurality of containers each adapted to be supplied with liquid to contain a mass of liquid, a tubular element in each said container, said tubular elements being serially inter-connected for conveying the fluid through the apparatus, and an inlet to each said container for a gaseous coolant arranged below the tubular element, the arrangement being such that the gaseous coolant traverses the liquid in each container in succession, the direction of flow of the gaseous coolant with respect to the successive masses of liquid being in a direction counter to that of the fluid with respect to the successive masses of liquid.

6. Apparatus for cooling a fluid by heat interchange with a gaseous coolant, comprising a plurality of containers each adapted to contain a mass of liquid, a tubular element in each said container, said tubular elements being serially inter-connected for conveying the fluid through the apparatus, an inlet to each said container for a gaseous coolant arranged below the tubular element, and a gas dispersing member between said inlet and said tubular element, the arrangement being such that the gaseous coolant traverses the liquid in each container in succession, the direction of flow of the gaseous coolant with respect to the successive masses of liquid being in a direction counter to that of the fluid with respect to the successive masses of liquid.

ROBERT COWELL GODFREY.

REFERENCES CITED

The following references are of record in the file of this patent:

UNITED STATES PATENTS

| Number | Name | Date |
| --- | --- | --- |
| 158,269 | Garrison | Dec. 29, 1874 |
| 1,425,019 | Jordan | Aug. 8, 1922 |
| 1,627,544 | Isom et al. | May 3, 1927 |
| 1,869,340 | Mann | July 26, 1932 |
| 1,989,399 | Browne | Jan. 29, 1935 |